United States Patent
Tsukahara et al.

(10) Patent No.: US 6,628,581 B1
(45) Date of Patent: Sep. 30, 2003

(54) SERVO CONTROL METHOD AND SERVO CONTROLLER OF A STORAGE DEVICE, AND ITS STORAGE DEVICE

(75) Inventors: Wataru Tsukahara, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/550,894

(22) Filed: Apr. 17, 2000

(30) Foreign Application Priority Data

Sep. 20, 1999 (JP) .......................................... 11-304473

(51) Int. Cl.$^7$ ................................................. G11B 7/00
(52) U.S. Cl. .................................................... 369/44.28
(58) Field of Search ..................... 369/44.11, 44.14, 369/44.17, 44.18, 44.26, 44.28, 44.32, 44.41; 360/78.04, 78.05, 78.14

(56) References Cited

U.S. PATENT DOCUMENTS

| | | | |
|---|---|---|---|
| 5,481,510 A | * 1/1996 | Masaki et al. ............ | 369/30.13 |
| 5,768,227 A | * 6/1998 | Baba ........................ | 369/44.28 |
| 5,870,356 A | * 2/1999 | Ikeda ....................... | 369/44.28 |
| 5,892,742 A | * 4/1999 | Yamashita et al. ....... | 369/44.27 |
| 5,933,397 A | * 8/1999 | Yamashita et al. ....... | 369/44.28 |
| 6,118,739 A | * 9/2000 | Kishinami et al. ....... | 369/44.32 |
| 6,157,599 A | * 12/2000 | Yamashita et al. ....... | 369/44.28 |
| 6,243,226 B1 | * 6/2001 | Jeong ....................... | 369/44.29 |
| 6,249,496 B1 | * 6/2001 | Tsukahara et al. ....... | 369/44.29 |
| 6,341,107 B1 | * 1/2002 | Watanabe ................. | 369/44.25 |

FOREIGN PATENT DOCUMENTS

| | | |
|---|---|---|
| JP | 61177644 | 8/1986 |
| JP | 2306482 | 12/1990 |
| JP | 5119839 | 5/1993 |
| JP | 10134380 | 5/1998 |
| JP | 11195232 | 7/1999 |

* cited by examiner

*Primary Examiner*—Thang V. Tran
*Assistant Examiner*—Bach Vuong
(74) *Attorney, Agent, or Firm*—Greer, Burns & Crain, Ltd.

(57) ABSTRACT

This invention relates to a servo-control method and servo-controller of a memory storage device, as well as the memory storage device, for positioning the reading position of a head on a target position. It suppresses phase lag in the high region while preventing a decrease in follow-ability. This invention comprises a storage medium 72, head 76, actuator 60, detection circuit 48, and control circuit 16. The detection circuit 48 detects the amount of shift between the reading position of the head 76 and a target position. The control circuit 16 performs PID calculation for the shift amount and outputs an instruction value for the actuator 60. There is a limiter 121 for limiting the calculated result of the differential component of this PID calculation to a specified value. Only the high region is limited and the low region is not limited, thus it is possible to suppress phase lag in the high while maintaining follow-ability.

16 Claims, 11 Drawing Sheets

SERVO CONTROL METHOD AND SERVO CONTROLLER OF A STORAGE DEVICE, AND ITS STORAGE DEVICE

BACKGROUND OF THE INVENTION

1. Field of the Invention

This invention relates to a servo-control method and servo-controller of a storage device, as well as the storage device, for reading data on a track of a storage medium by way of a head, and more particularly to a servo-control method and servo-controller of a storage device and the storage device for positioning the optical beam of the head at a target position.

2. Description of the Related Art

Memory storage devices that use storage media such as optical disks or magnetic disks are widely used. For example, as optical-disk devices there are CD players, CD-R drives, or magneto-optical drives. In reproduction devices or recording/reproduction devices that use these kinds of storage media, it is necessary to position the reading position of the head at a target position.

There is a servo-control unit installed in a memory storage device that uses this kind of medium for positioning the reading position of the head at a target position. This servo-control unit detects an error signal that indicates a position deviation between the reading position of the head and the target position, and then controls the reading position of the head such that it follows the target position. An example of using this kind of servo control in a magneto-optical device, that is used as the external memory storage device of a computer, is explained.

In a magneto-optical disk device, a magneto-optical disk medium is used for storing data. This disk medium comprises a substrate, and recording layer that is formed on top of the substrate and that is made of a magnetic material. This medium is recorded information by using the change in heat and magnetic field due to light. There is a data track on this medium for recording and reproducing the data. Generally, a spiral shaped groove (tracking groove) is formed on the top of the substrate of the disk medium. The recording/reproduction track for data is formed on the land between grooves.

The optical beam from an optical head tracks this track. Information is recorded on the track during recording by using the change in heat and magnetic field that occurs due to light. When reproducing the information, magneto-optical effect is used to reproduce the information from the reflected light of the light beam. To record and reproduce information, a laser beam from a laser diode passes through the objective lens of the optical head and is focused on the surface (recording surface) of the disk medium. This focused state must be maintained, as well as the just-focused state. The servo control required to do this is called focus-servo control.

Moreover, in order to record data on or reproduce data from that data track, the laser beam in the just-focused state must follow the data track. This servo control is called track-servo control.

Furthermore, together with track-servo control, the VCM for driving the carriage is controlled by servo control in order to maintain the track actuator position in the center position of the carriage (optical head). This is called carriage-servo control.

Also, when seeking, the track actuator is controlled by servo control in order to lock the objective lens of the optical head in the center of the carriage. This is called lens-lock-servo control.

A prior servo-control system is explained using the focus-servo system. Operation is basically the same for track-servo control, carriage-servo control and lens-lock-servo control.

The optical head receives the reflected beam of the light beam that is irradiated on to the optical disk. The focus-error detection circuit generates a focus error signal (FES) that indicates the amount of shift from the focus point in the focus direction from the reflected light. The focus-servo control generates a focus-drive signal from the focus-error signal to do away with the shift of the focus position. The focus actuator is driven by this focus-drive signal and moves the objective lens of the optical head in the focus direction to make the focus position of the light beam follow the recording surface.

A PID filter is used for generating the focus-drive signal from the focus-error signal. The PID filter calculates a signal that is proportional to the error signal (P component), a signal that is integrated from the error signal (I component) and a signal that is a differential of the error signal (D component), and adds the calculated results of each of these, the P component corresponds to a pass filter, the I component corresponds to a low-pass filter (LPF) for performing low-region compensation, and the D component corresponds to a high-pass filter (HPF) for performing phase compensation.

The result of low-region compensation and phase compensation by the PID filter is output as an instruction value by the power amp to drive the focus actuator. By employing this kind of low-region compensation and phase compensation, stable feedback control is possible.

However, in the high region, the phase characteristics lag due to the power amp characteristics and coil inductance of the focus actuator. Therefore, the current resulting from the calculated result (instruction value) does not flow as is to the focus coil, and the focus coil is driven by the dull rising current. Similarly, the same occurs in the track-servo system, carrier-servo system and lens-lock-servo system.

Therefore, when high-frequency noise is generated in the focus-error signal due to medium defects or external vibration, the servo system tries to follow that noise as well, so an instruction value that causes a large current to flow is output. The actual current that flows in the focus actuator in response to this instruction value lags due to reasons described later. For example, a large current flows on one side due to the first instruction value in response to the noise. Then, since the response to instruction values after that are slow, the focus system does not stabilize leading to the off-focus state.

In order limit this kind of large current, a method of limiting the current flowing in the focus actuator only during seeking (when crossing a track) has been proposed (for example, Japanese Unexamined Published Patent S61-177644).

However, the prior art had that following problem.

The prior method, limited the entire current and by large current not flowing, it prevented the focus coil from burning. In this method, by limiting the entire current, it is possible to prevent phase lag from equivalently appearing in the instruction value. However, since the low region is also limited, there is a problem in that the ability to follow low-region position shifts greatly decreases. For example, the ability to follow surface diffraction of the optical disk in the focus direction decreases. The prior method limits the current value only during seeking (crossing tracks), so the ability to follow did not become a problem.

SUMMARY OF THE INVENTION

The objective of this invention is to provide a servo-control method and servo-controller for a storage device, as well as a storage device for equivalently restraining phase lag in the high region while maintain follow-ability in the low region.

Another objective of this invention is to provide a servo-control method and servo-controller for a storage device, as well as a storage device for preventing over responding to noise and high-frequency component.

A further objective of this invention is to provide a servo-control method and servo-controller for a storage device, as well as a storage device for keeping the margin for noise and high-frequency component while maintaining the follow-ability of surface diffraction and eccentricity of the optical storage medium.

This invention provides a servo-control method of a storage device with a head that reads information from a storage medium comprising: a step of detecting an amount of position shift between a read position of the head and a target position, a step of performing PID calculation of the detected position shift, and a step of driving an actuator for positioning the read position of the head at the target position based on the PID calculation result. The PID calculation step includes a step of limiting the calculated result of the differential component of the PID calculation to a specified value.

In this invention, takes into consideration the problem of phase lag in the high region. Therefore, in order that phase lag does not equivalently appear in the high region of the servo system, the high-region component, or in other words, the calculation results of the differential component of the PID calculation, is limited to a specified value. By doing this, it is possible to maintain the margin for noise or high-frequency component even for a system with large high-region phase lag. Moreover, since the low-region component, or in other words the calculation results of the integral component, is not limited, it is possible to prevent a decrease in follow-ability in the low region. Therefore, it is possible to prevent phase lag in the high region without a decrease in follow-ability.

In another feature of this invention, the drive step comprises a step of driving an actuator for positioning a light beam from the head at a target position. A servo system is applied for positioning the light beam at a target position on the optical storage medium, so it is possible to prevent phase lag in the high region without a decrease in follow-ability even for an optical medium with large surface diffraction or eccentricity.

In another feature of the invention, the detection step comprises a step of detecting the position shift of the light beam from the focus position on the storage medium, and the drive step comprises a step of driving a focus actuator for focusing the light beam on the recording surface of the storage medium.

This is applied to the focus-servo control of the light beam, so it is possible to prevent phase lag in the high region without decreasing follow-ability, even for an optical storage medium with large surface diffraction.

Moreover, in another feature of the invention, the detection step comprises a step of detecting position shift of the light beam from the center of the track of the optical storage medium, and the drive step comprises a step of driving the track actuator that makes the light beam follow the track of the storage medium.

This is applied to the track-servo control of the light beam, so it is possible to prevent phase lag in the high region without decreasing follow-ability, even for an optical storage medium with large eccentricity.

In yet another feature of the invention, the detection step comprises a step of detecting the position of a track actuator that makes the light beam follow the track on the storage medium, and the drive step comprises a step of driving a carriage actuator for driving a carriage having the track actuator.

This is applied to the carriage-servo control of the light beam, so it is possible to prevent phase lag in the high region without decreasing follow-ability, even for an optical storage medium with large eccentricity.

In another feature of the invention, the detection step comprises a step of detecting the position of a track actuator that makes the light beam follow the track on the storage medium, and the drive step comprises a step of driving the track actuator.

This is applied to the lens-lock-servo control of the light beam, so it is possible to prevent phase lag in the high region without decreasing follow-ability of the lens position control.

In another feature of the invention, the PID calculation step further comprises a step of limiting the calculation results of the proportional component of the PID calculation to a specified value.

When it is not possible to sufficiently control the phase lag in the high region by limiting only the differential component, the high-region phase lag is compensated by limiting the proportional component as well.

Still another feature of the invention comprises a step of executing the limit step, when the light beam is being controlled to follow the track on the storage medium. The limiting process limits the output of the instruction value and follow-ability decreases a little. Therefore, the limiting process is limited to the steady state during tracking. Also, limiting process is prohibited when seeking and good follow-ability is required, when focusing, and when the tracking servo is off. This makes it possible to maintain stability even when seeking.

In one feature of the servo-control device of this invention comprises: an actuator for positioning a reading position of the head at a target position, a detection circuit for detecting the amount of position shift between the reading position of the head and target position, a control circuit for performing PID calculation for the detected amount of position shift, and a drive circuit for driving the actuator based on the calculated results. The control circuit limits the calculation results of the differential component of the PID calculation to a specified value.

In this form of the invention, it is possible to prevent phase lag in the high region without decreasing follow-ability.

DESCRIPTION OF THE PREFERRED EMBODIMENTS

Figure 1:
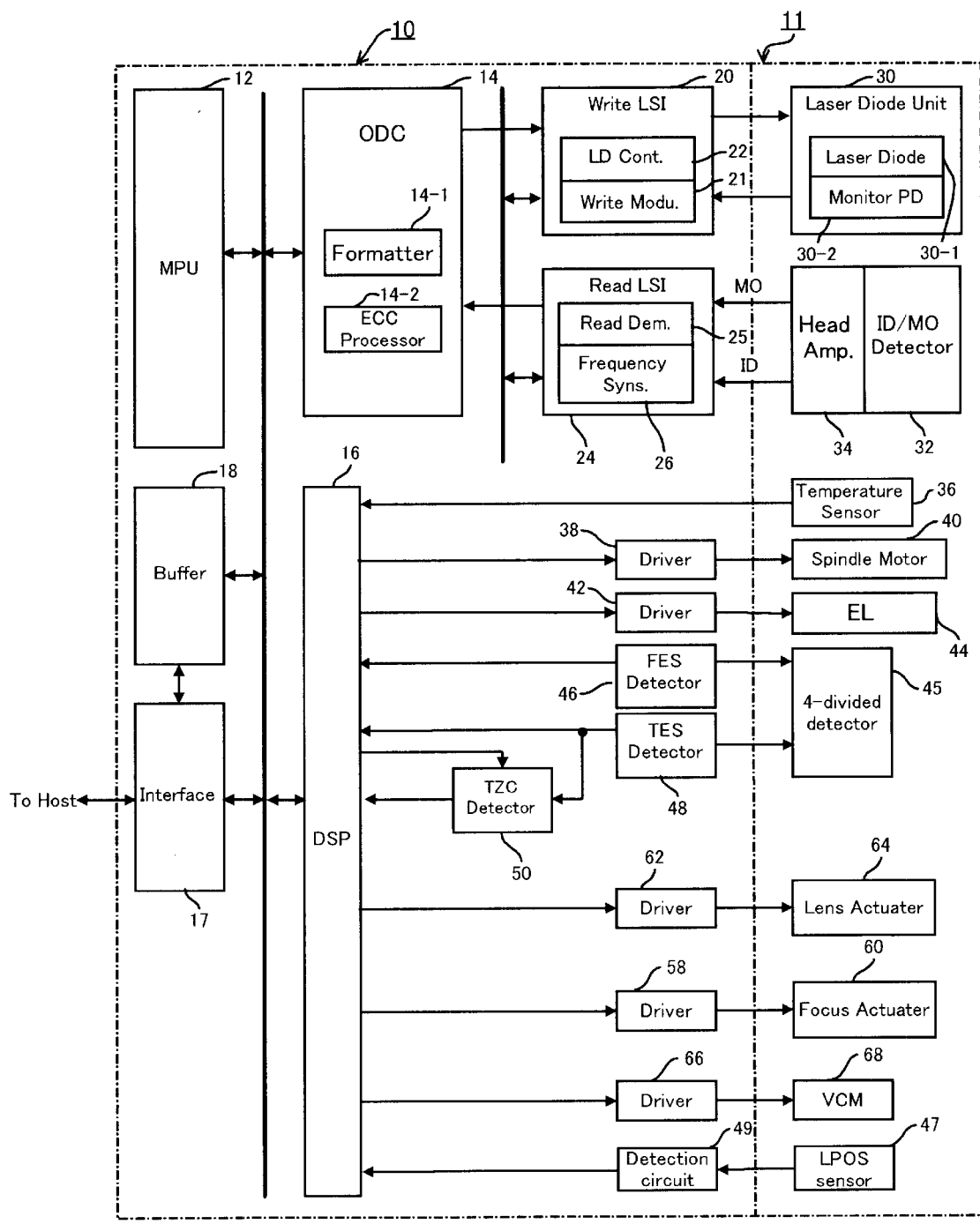
FIG. 1 is block drawing of a magneto-optical device of one embodiment of this invention.
Figure 2:
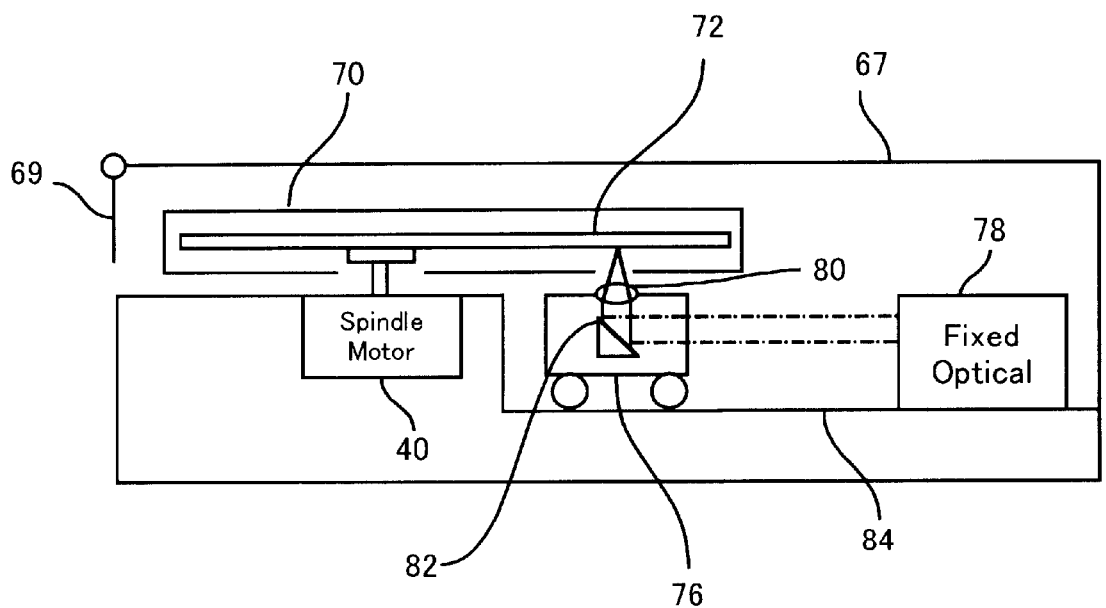
FIG. 2 is a configuration diagram of the optical disk drive in FIG. 1.

FIG. 1 is a block diagram of a magneto-optical device of one embodiment of the invention. FIG. 2 is a schematic diagram of the optical disk drive in FIG. 1.

As shown in FIG. 1, the magneto-optical disk device comprises a control unit 10 and disk drive 11. A MPU (microprocessor) 12 performs overall control of the magneto-optical disk device. An interface 17 is used for exchanging commands and data with a host (not shown in the figure). An optical disk controller (ODC) 14 performs the necessary processing form reading and writing to a magneto-optical disk (MO). A DSP (digital signal processor) 16 controls all of the mechanisms described below based on instructions from the MPU 12. A buffer memory (RAM) 18 is used by both the MPU 12 and ODC 14 to store write data and read data.

Provided is a formatter 14-1 and an error correction code (ECC) processor 14-2 in the ODC 14. The formatter 14-1, during write processing, divides the NRZ write data into sectors on the optical disk, and generates a record format. The ECC processor 14-2 generates ECC in sector data units and adds it to the sector data. In addition, the ECC processor 14-2, when necessary, generates cyclic redundancy check (CRC) code and adds it to the data. Furthermore, the ECC processor 14-2 converts the sector data to which the ECC is added into 1-7 run length limit code (RLL).

During read processing, the ECC processor 14-2 performs 1-7 RLL reverse conversion of the read sector data and then performs a CRC check. In addition, the ECC processor 14-2 detects and corrects errors by the ECC. Furthermore, the formatter 14-1 links the NRZ data in sector units and creates a NRZ read data stream. This data stream is transferred to the host from the interface 17 by way of the buffer memory 18.

A write LSI circuit 20 comprises a write modulation unit 21 and laser diode control circuit 22. The write modulation unit 21 modulates the write data into bit-position modulation (PPM) record (also called mark record) data format or pulse wide modulation (PWM) record (also called edge record) data format. The laser diode control circuit 22 controls the laser diode unit 30 of the optical unit of the drive 11 using this modulated data. This laser diode unit 30 comprises a laser diode 30 for irradiating a laser beam onto the magneto-optical disk, and a monitor detector 30-2.

The read LSI circuit 24 comprises a read demodulation unit 25 having an AGC (auto gain control) circuit, filter, and sector-mark detection circuit, and a frequency synthesizer 26. The read demodulation unit 25 generates read-clock and read data from an input ID signal or MO signal, and then demodulates PPM data or PWM data into the original NRZ data. An ID/MO detector 32 of the optical head of the drive 11 detects light returning from the magneto-optical disk and inputs an ID signal/MO signal to the read LSI circuit 24 by way of the head amp 34. The frequency synthesizer 26 generates a frequency clock as the read clock that corresponds to the zone on the magneto-optical disk.

A temperature sensor 36 located in the drive 11 detects the temperature of the drive. The detected temperature is given to the MPU 12 by way of the DSP 16. The MPU 12, based on the detected temperature, maximizes the light-emission power of the laser diode control circuit 22 for reading, writing and erasing.

A spindle motor 40 rotates the magneto-optical disk. The DSP 16 controls the spindle motor 40 by way of a driver 38 according to an instruction from the MPU 12. An electromagnet 44 supplies an external magnetic field to the loaded magneto-optical disk when writing and erasing. The DSP 16 controls the electromagnet 44 by way of a drive 42 according to an instruction from the MPU 12. A 4-division detector 45 detects the light returning from the magneto-optical disk. A FES detection circuit 46 generates a focus-error signal (FES) from the output of the 4-division detector 45, and inputs it to the DSP 16. The DSP uses the focus-servo loop, described later, to generate a focus-drive signal, and controls a focus actuator 60 by way of a driver 58. The focus actuator 60 drives the objective lens of the optical head in the focus direction. Focus-servo control is performed in this way.

A TES detection circuit 48 generates a track-error signal (TES) from the output of the 4-division detector 45, and inputs it to the DSP 16. The TES is also input to a track-zero-cross (TZC) detection circuit 50. The TZC detection circuit 50 generates a TZC pulse and inputs it to the DSP 16.

The DSP 16, based on this TES, uses the track-servo loop described later, to generate a track-drive signal, and controls a track (lens) actuator 64 by way of a driver 62. The track actuator 64 drives the objective lens of the optical head in the track direction. Track-servo control is performed in this way.

In addition, the DSP 16, based on the TZC, performs seek control and controls a voice coil motor (VCM) 68 by way of a driver 66. The VCM 68 moves the optical head.

A lens position (LPOS) sensor 47, detects the position of the objective lens of the optical unit. This LPOS signal is given to the DSP 16 by way of a detection circuit 49. In the case of a double servo, the DSP 16, based on the LPOS signal, uses a carriage-servo loop to generate a carriage (VCM) drive signal, and controls the voice coil motor (VCM) 68.

When seeking or when the track-servo loop is open, the DSP 16, based on the LPOS signal, uses a lens-lock-servo loop to control the track (lens) actuator 64.

FIG. 2 is a configuration diagram of the magneto-optical disk drive 11 in FIG. 1. As shown in FIG. 2, the spindle motor 40 described above is located inside a housing 67. A magneto-optical disk cartridge 70 is inserted from the inlet 69. A magneto-optical disk 72 inside the cartridge 70 is rotated by the spindle motor 40.

The optical head comprises a carriage 76 and fixed optical system 78. The carriage 76 is moved along a rail 84 by the VCM 68 (see FIG. 1) in the direction across the tracks of the magneto-optical disk 72. The carriage 76 comprises an objective lens 80, a directional conversion prism 82, a focus actuator 60, a track actuator 64 and lens position sensor 47. The fixed optical system 78 comprises the laser diode unit 30, ID/MO detector 32 and 4-division detector described above (see FIG. 1).

Figure 3:
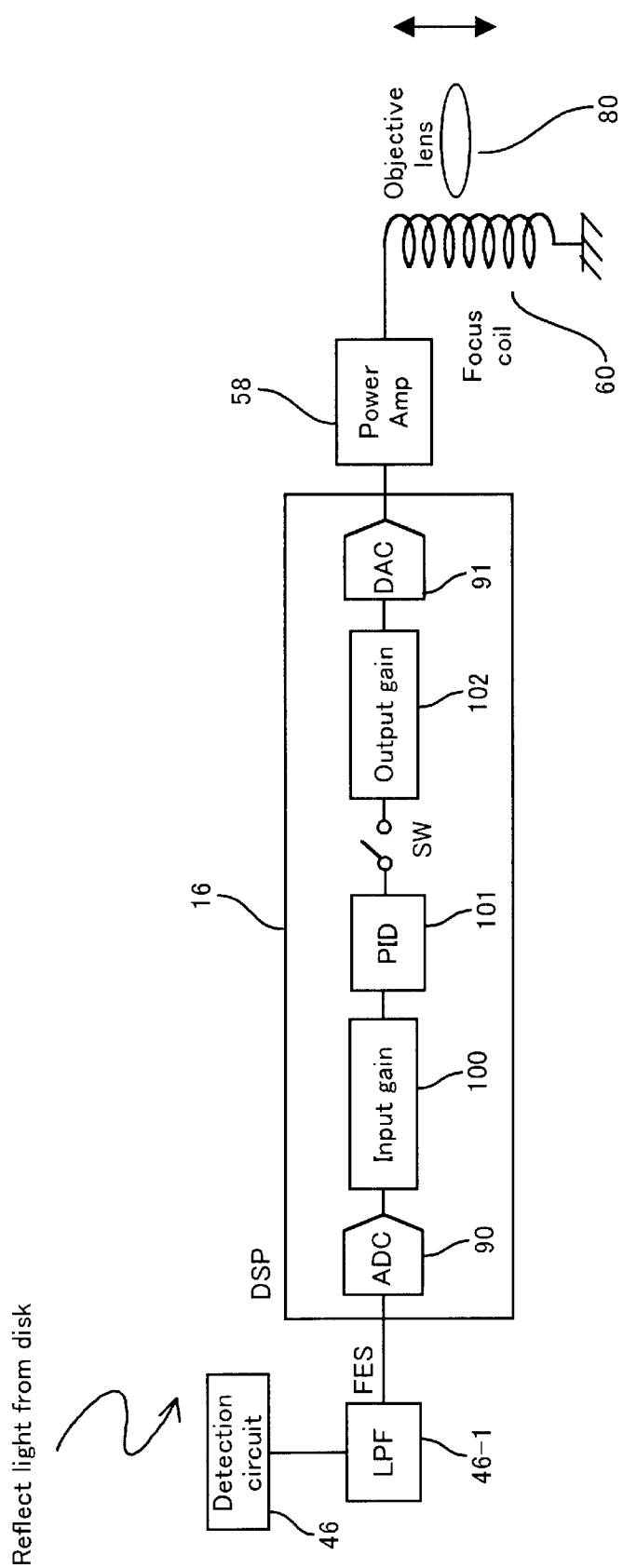
FIG. 3 is a block diagram of the focus-servo loop in FIG. 1.

FIG. 3 is a block diagram of the focus-servo loop in FIG. 1. The parts in FIG. 3 that are the same as those shown in FIG. 1 and FIG. 2 are indicated with the same code numbers.

The FES detection circuit 46 generates a focus-error signal FES from the output of the 4-division detector 45. This focus-error signal FES indicates the amount of position shift of the laser beam from the recording surface in the focus direction. The focus-error signal FES passes through a low-pass filter (LPF) 46-1,thereby removing a high range noise component over ½ or more frequency of the sampling frequency.

The analog/digital converter (ADC) 90 in the DSP 16 converts the focus-error signal FES mentioned above to a digital value. The output of the ADC 90 is read into the DSP 16 for each sampling frequency. The input gain unit 100 of the DSP 16 multiplies the digital value by an input gain G1, and absorbs fluctuations in the input sensitivity (circuit constant, signal sensitivity).

The output of the input gain unit 100 is input to a PID filter (calculation unit) 101. The PID filter 101 performs phase compensation processing as explained with FIG. 4. The output of the PID filter 101 is input to an output gain unit 102 by way of a switch SW. The output gain unit 102 multiplies that output by an output gain G2 and absorbs fluctuations in output sensitivity (drive sensitivity of the driver, acceleration of the actuator). This output (instruction value) is given to a digital/analog converter (DAC) 91. The DAC 91 converts this digital value to an analog-focus current, inputs it to a driver (power up) 58 and drives a focus actuator (focus coil) 60. The focus coil 60 drives the objective lens in the focus direction. The focus of the laser beam is controlled in this way.

The detection sensitivity of the error-signal detection circuit, and the acceleration performance of the focus actuator fluctuates due to the driver. Therefore, more stable control is necessary in order to remove differences that occur between each drive. The process for absorbing the differences between drives is the gain-adjustment process. The input gain and the output gain are set during gain adjustment, and adjusted to values that are unique to the drive.

The ADC 90 and DAC 91 of the DSP 16 are hardware, and the input-gain unit 100, PID filter 101 and output-gain unit 102 are software for the DSP 16.

Figure 4:
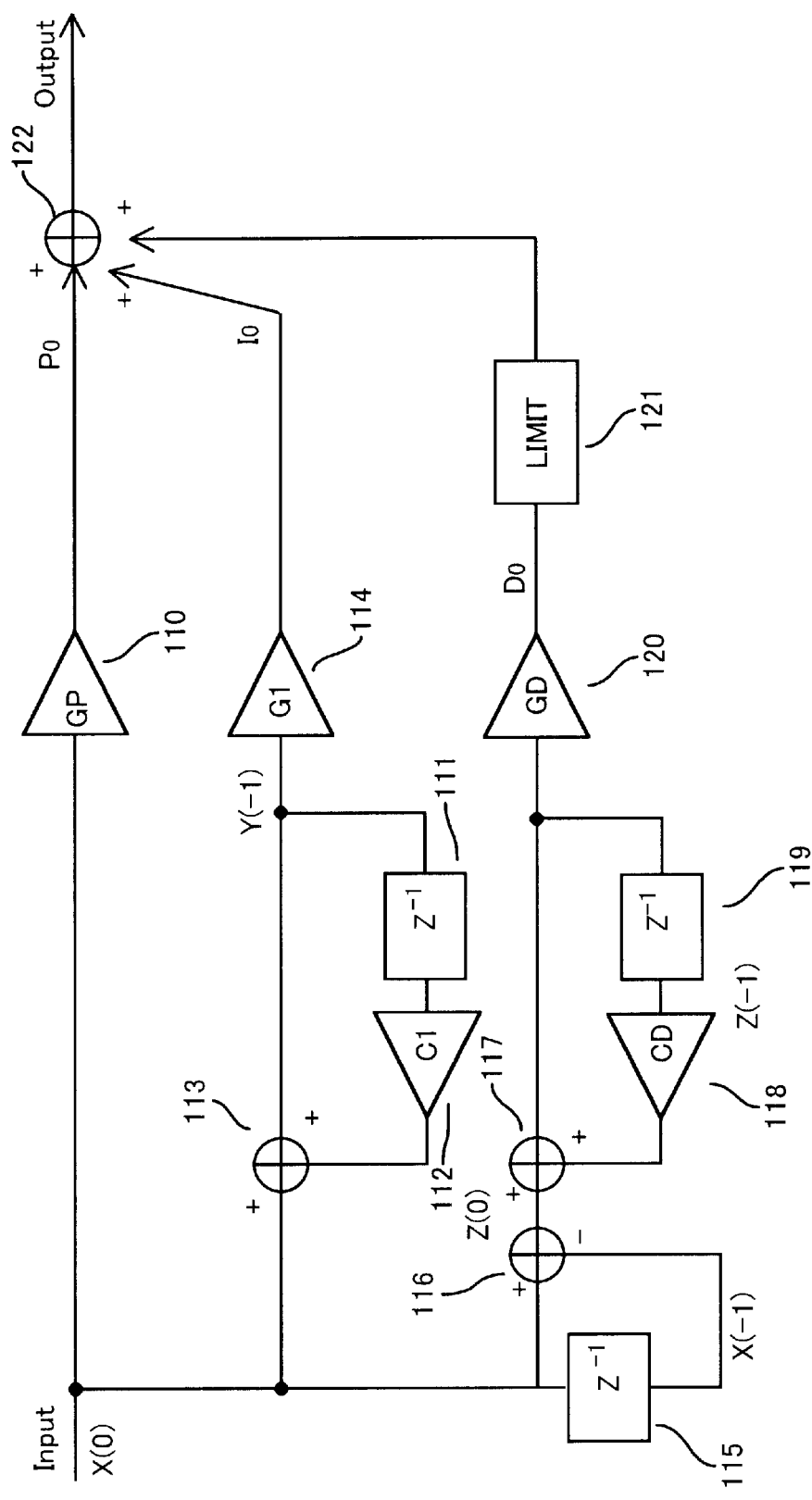
FIG. 4 is an equivalent circuit diagram of the PID filter in FIG. 1.
Figure 5:
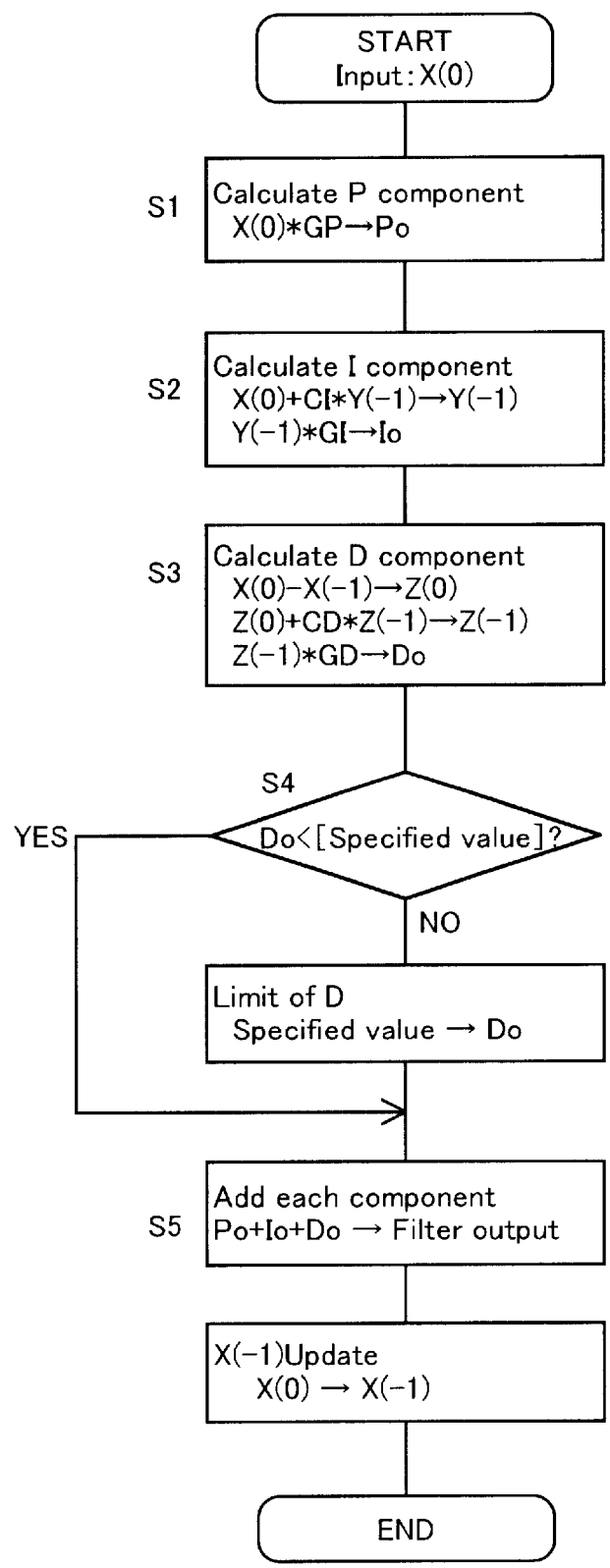
FIG. 5 is a flowchart of the PID calculation of the PID filter in FIG. 4.
Figure 6:
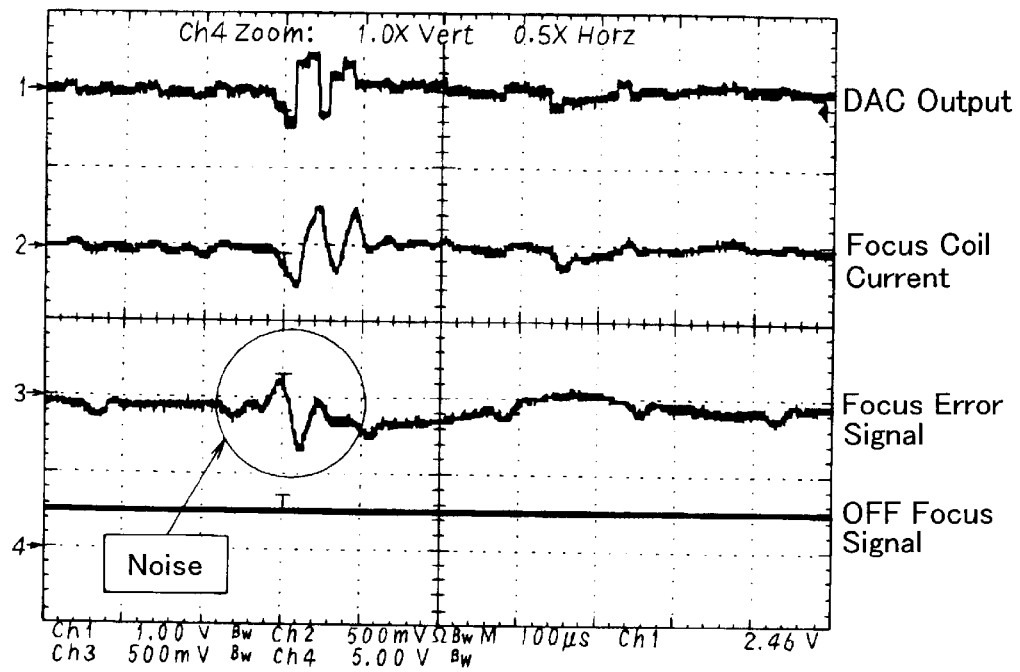
FIG. 6 is a waveform diagram for explaining the effect of the invention.
Figure 7:
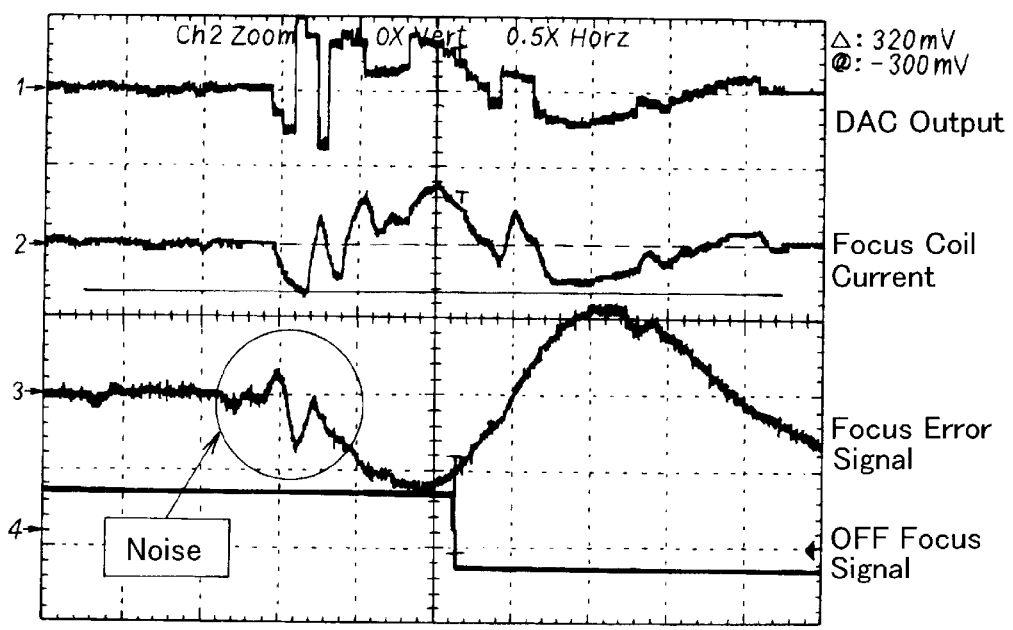
FIG. 7 is a waveform diagram of a comparative example for explaining the effect of the invention.

FIG. 4 is a equivalent circuit drawing of the PID filter in FIG. 3. FIG. 5 is a flowchart of the PID calculation in FIG. 3. FIG. 6 explains the effect of the invention. FIG. 7 explains a comparative example.

The calculation flow show in FIG. 5 will be explained by referencing the equivalent circuit in FIG. 4.

(S1) First, the P (proportional) component P0 is calculated. By taking the proportional gain to be GP and the input value to be X(0), then the P component P0 is calculated by equation (1) below.

$$P0 = X(0) \times GP \quad (1)$$

The amp 110 of the equivalent circuit shown in FIG. 4 corresponds to this processing.

(S2) Next, the I (integral) component I0 is calculated. By taking the integral gain to be GI, the input value to be X(0), and the feedback gain to be CI, then the I component I0 is calculated by equations (2) and (3) below.

$$Y(-1) = X(0) + CI \times Y(-1) \quad (2)$$

$$I0 = Y(-1) \times GI \quad (3)$$

The summing integrators 111, 112, 113 and amp 114 in the equivalent circuit shown in FIG. 4 correspond to this process.

(S3) Next, the D (differential) component D0 is calculated. By taking the differential gain to be GD, the input value to be X(0), and the feedback gain to be CD, then the D component D0 is calculated by equations (4), (5) and (6) below.

$$Z(0) = X(0) - X(-1) \quad (4)$$

$$Z(-1) = Z(0) + CD \times Z(-1) \quad (5)$$

$$D0 = Z(-1) \times GD \quad (6)$$

The differential calculators 115, 116, summing integrators 117, 118, 119 and amp 120 in the equivalent circuit shown in FIG. 4 correspond to this process.

(S4) Next, the calculated result of the D component is limited to a specified value. To do this, the calculated result of the D component DO is compared with the specified value. When the calculated result of the D component D0 is greater than the specified value, then the calculated result of the D component D0 is replaced by the specified value. On the other hand when the calculated result of the D component D0 does not exceed the specified value, then the calculated result of the D component D0 is used.

The limiter 121 in the later stage of the amp 120 in the equivalent circuit shown in FIG. 4 corresponds to this process.

(S5) Next, the calculated results of all of the components are added to obtain the filter output PID. The filter output PID is obtained from equation (7) below.

$$PID = P0 + I0 + D0 \quad (7)$$

The summer 122 in the equivalent circuit shown in FIG. 4 corresponds to this process.

This calculation is completed by updating X(-1) above to X(0).

FIG. 6 is a waveform diagram of the DAC output (instruction value), focus-coil current, focus-error signal, and off-focus signal when the output result of the differential component is limited to a specified value by the process described above. FIG. 7 is a waveform diagram of the DAC output (instruction value), focus-coil current, focus-error signal, and off-focus signal when the output result of the differential component is not limited to a specified value. Both diagrams show when there is noise in the focus-error signal FES.

In the comparative example of FIG. 7, the state when the focus-coil current greatly lags the instruction value from the DAC can be seen. In other words, large current flows on one side due to the first DAC instruction value in response to the noise. However, since the response to instruction values after that are slow, the amount of focus error becomes large, and finally leads to the off-focus state.

However, in the case of this invention shown in FIG. 6, the differential calculation is limited, so the response to noise in the focus-error signal FES become small. This makes it possible to keep operation from becoming unstable when noise occurs without the current becoming unbalanced.

Moreover, since the differential component is limited and the proportional and integral components are not limited, the low-region component does not change. Therefore, it is possible to adequately follow low-frequency surface diffraction of the optical disk. It is also possible to maintain sufficient margins for noise caused by defects or vibration of the optical disk.

This limit process gives a limit to the DAC output (instruction value), so it is best used for suppressing noise, or in other words, restricted to a stable condition such as in tracking. For example, during seek control, the light beam crosses the tracks, so a high-frequency component occurs in the focus-error signal. In this case, it is necessary to follow this high frequency. Therefore, during seek control, the limit process is made to be invalid. This makes it possible to maintain stability for large changes in operation.

Similarly, when the track-servo loop is open and the focus-servo loop is closed, crosstalk from the track-error signal occurs in the focus-error signal. Furthermore, during focus entry (focusing), sudden acceleration is necessary. In this case as well, by making the limit process invalid, it is possible to maintain stability.

Moreover, during gain adjustment for absorbing differences in sensitivity of the input system and output system, or in other words, fluctuations in the sensitivity of the error-signal detection circuit or in acceleration performance of the actuator, accurate measurement results are desired. In this case as well, the limit process is made invalid. This makes it possible to prevent unfavorable effect on the adjustment results.

Figure 8:
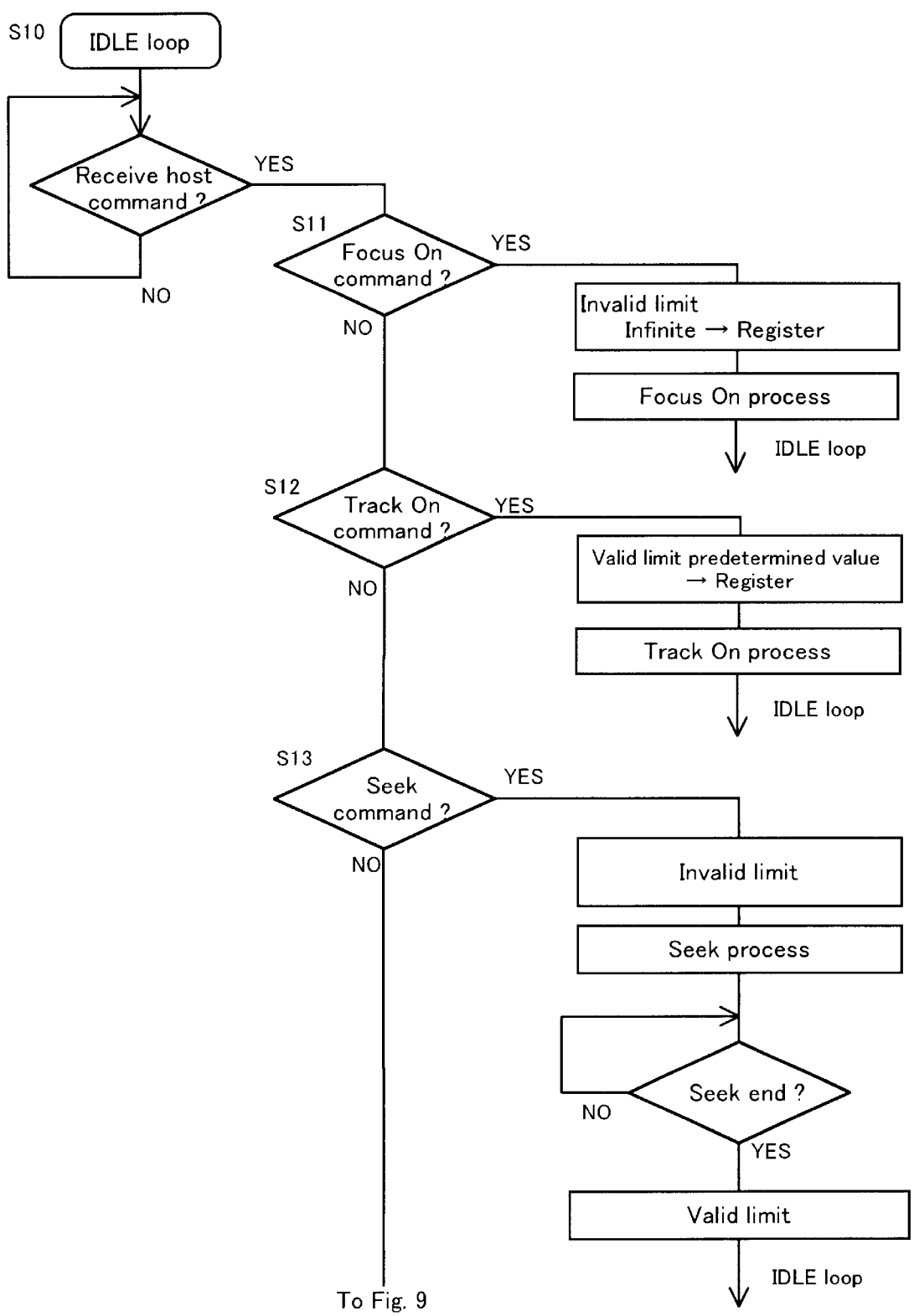
FIG. 8 is a flowchart (½) of the limiting operation control of one embodiment of the invention.
Figure 9:
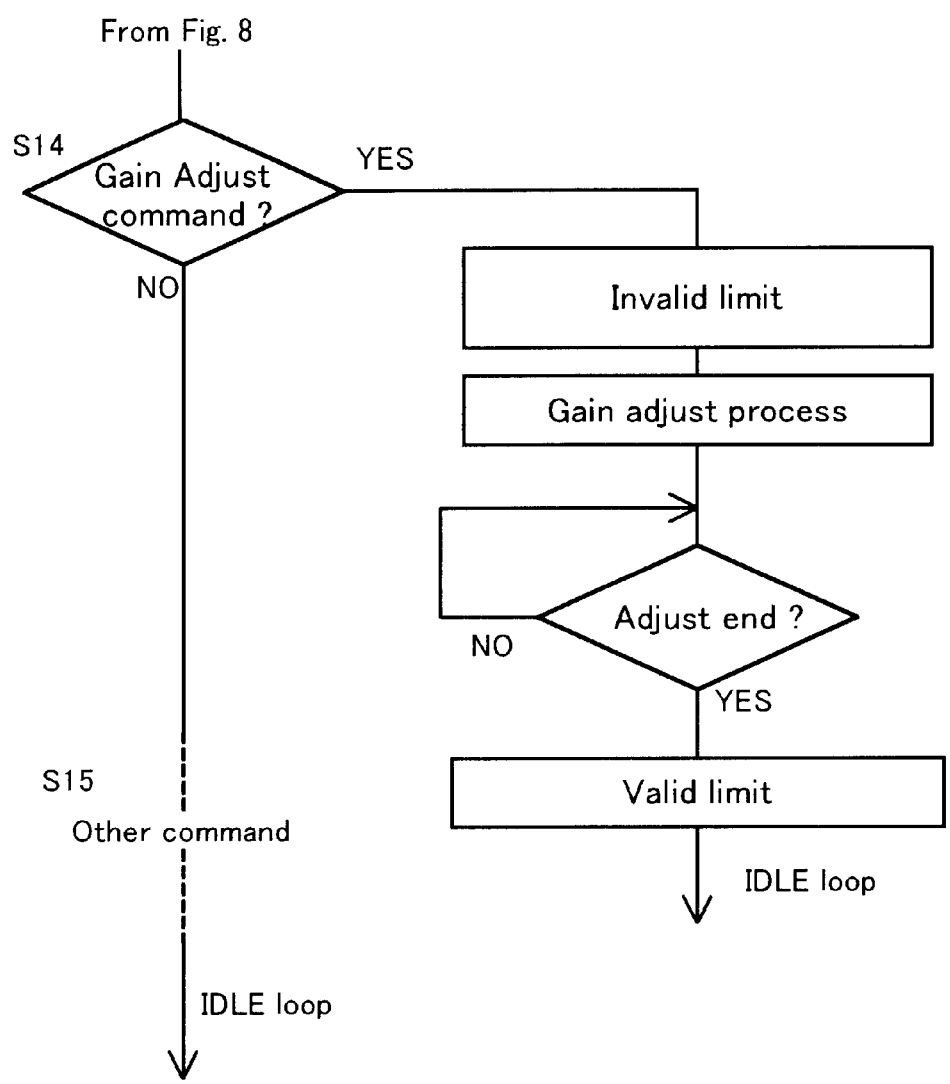
FIG. 9 is a flowchart (2/2) of the limiting operation control of one embodiment of the invention.

Controlling this limit process to make it valid or invalid can be performed easily by adding a setting process to the main routine of the DSP. The flow of the main routine to which this limit operation control has been added is shown in FIG. 8 and FIG. 9.

(S10) The idle loop determines whether a host command has been received from the MPU 12.

(S11) When a host command has been received, it is judged what kind of command it is. When the command is a focus-on command, first, infinity is set for the specified-value setting register that is used in step S4 described above. By doing this, in step S4, the differential component is judged whether it is larger than infinity, and the limit operation becomes invalid. Next, the focus-on process (focusing process) is performed. In other words, the focus-servo loop described above is turned ON and focusing is performed. Also, processing returns to the idle loop.

(S12) When the host command is a track-on command, first, a specified value is set in the specified-value setting register used in step S4 described above. By doing this, in step S4, the differential component is judged whether is larger than the specified value, and the limit operation becomes valid. Next, track-on processing (tracking process) is performed. In other words, the track-servo loop described above is turned ON, and tracking is performed. Also, processing returns to the idle loop.

(S13) When the host command is a seek command, first, infinity is set in the specified-value setting register used in step S4 described above. By doing this, in step 4, the differential component is judged whether it is larger than infinity, and the limit operation becomes invalid. Next, the seek process is performed. In other words, the DSP 16 counts the track-zero-cross signals, and calculates the difference up to the target track, then drives the VCM 68 according to the calculated result. After that, it is judged whether the seek process is finished. When the seek process is finished, a specified value is set in the specified-value setting register. This makes the limit operation valid. Also, processing returns to the idle loop.

(S14) When the host command is a gain adjustment command, first, infinity is set in the specified-value setting register used in step S4 described above. By doing this, the limit operation is made invalid. Next, the gain-adjustment process is performed. After that, adjustment is judged whether it is finished. When adjustment is finished, a specified value is set in the specified-value setting register. This makes the limit operation valid. Also, processing returns to the idle loop.

(S15) When the host command is any other command, the processing for that command is performed and then processing returns to the idle loop.

In this way, it is possible to control the limit process to be valid or invalid by changing the value of the specified-value setting register with a command. Also, since just the value of a setting register is set, this control is possible by just adding a simple process to the main routine.

The limit operation is made invalid in this way during focus-entry, track-servo off, seek, and gain adjustment. Also, the limit operation is valid when the focus servo is on and the track servo is on.

Figure 10:
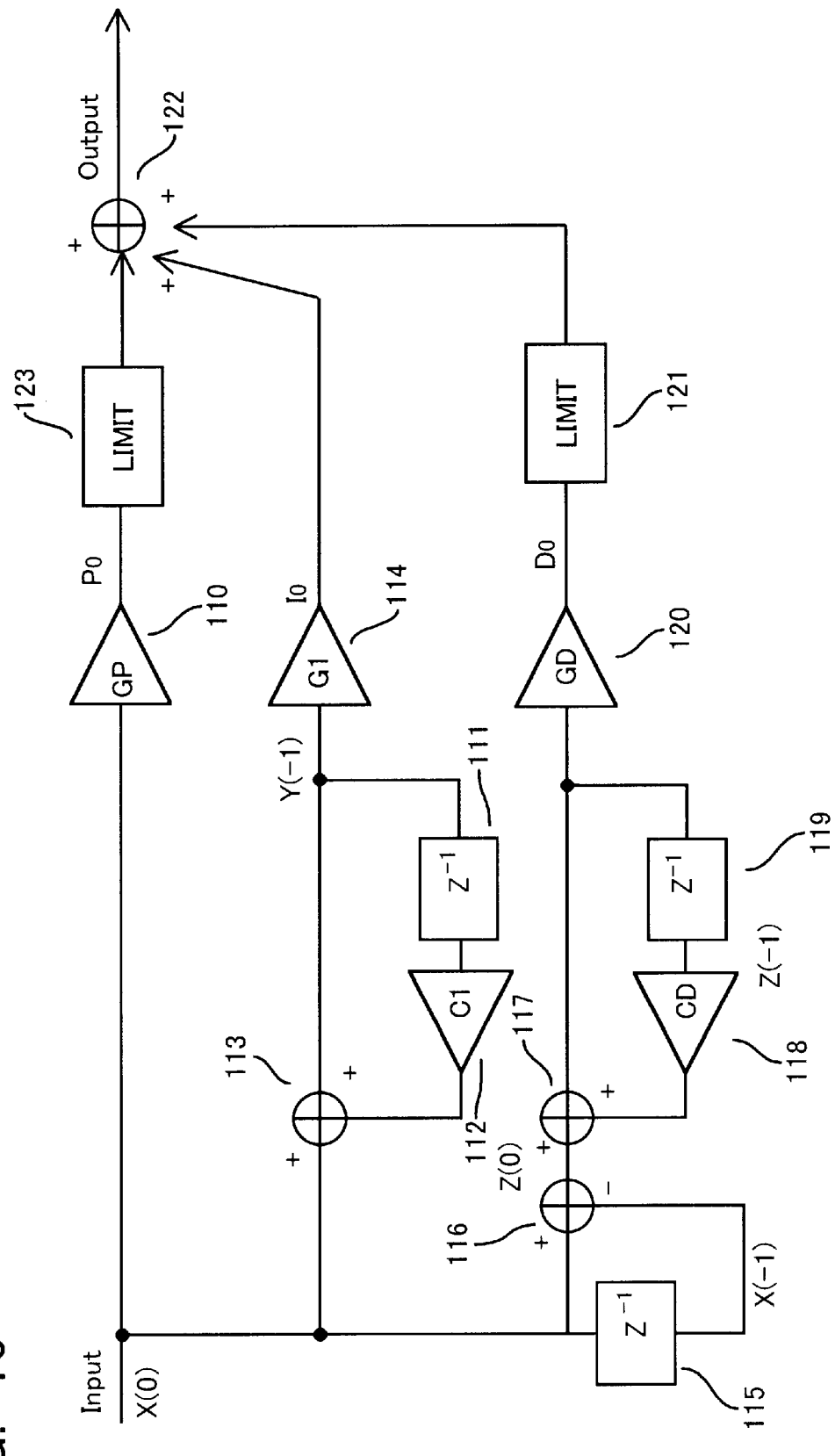
FIG. 10 is an equivalent circuit diagram of another PID filter.
Figure 11:
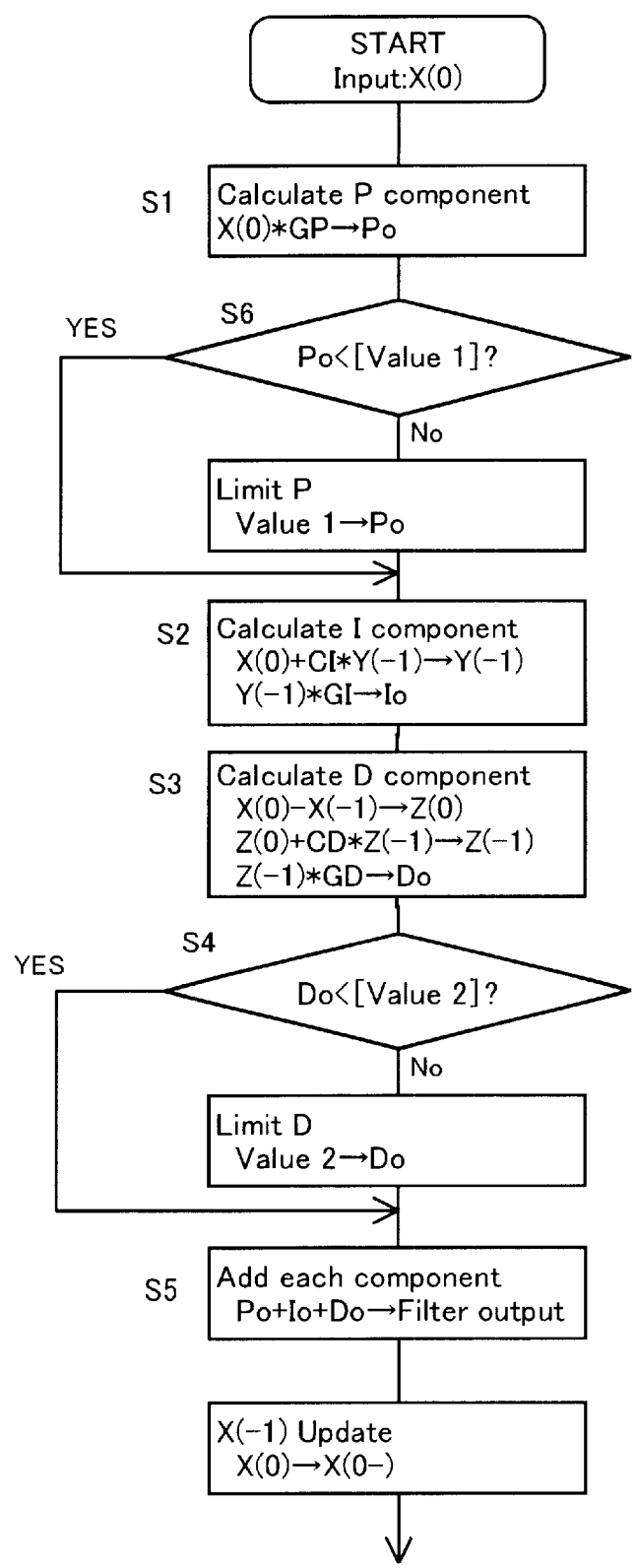
FIG. 11 is a flowchart of PID calculation for another PID filter.

FIG. 10 is an equivalent circuit drawing of another PID filter in FIG. 3. FIG. 11 is a flowchart showing the calculation flow of another PID in FIG. 3. In FIG. 10 and FIG. 11, parts and steps that are the same as those shown in FIG. 4 and FIG. 5 will be indicated with the same codes. In this embodiment, the proportional component is also limited. In FIG. 10, a limiter 123 for limiting the proportional component output is added to the configuration in FIG. 4. In FIG. 11, a limiting step S6 for limiting the proportional component output is added.

(S6) When the proportional component P0 is calculated in step S1, the calculated result of the P component are limited to a specified value. To do this, the calculated result of the P component P0 is compared with a specified value 1. When the calculated result of the P component P0 is greater than the specified value 1, then the calculated result of the P component P0 is replaced with the specified value 1. On the other hand, when the calculated result of the P component P0 does not exceed the specified value 1, then the calculated result of the P component P0 is used. Also, processing advances to step S2.

The limiter 123 in the later stage of the amp 110 in the equivalent circuit in FIG. 10 corresponds to this process.

In this way, in the case of a system with large phase lag in the high region, by limiting the proportional component as well as the differential component, it is possible to sufficiently suppress the phase lag in the high region even when the system has large high-region phase lag. Also, the specified value 1 for the proportional component and the specified value 2 for the differential component are set to different values.

Figure 12:
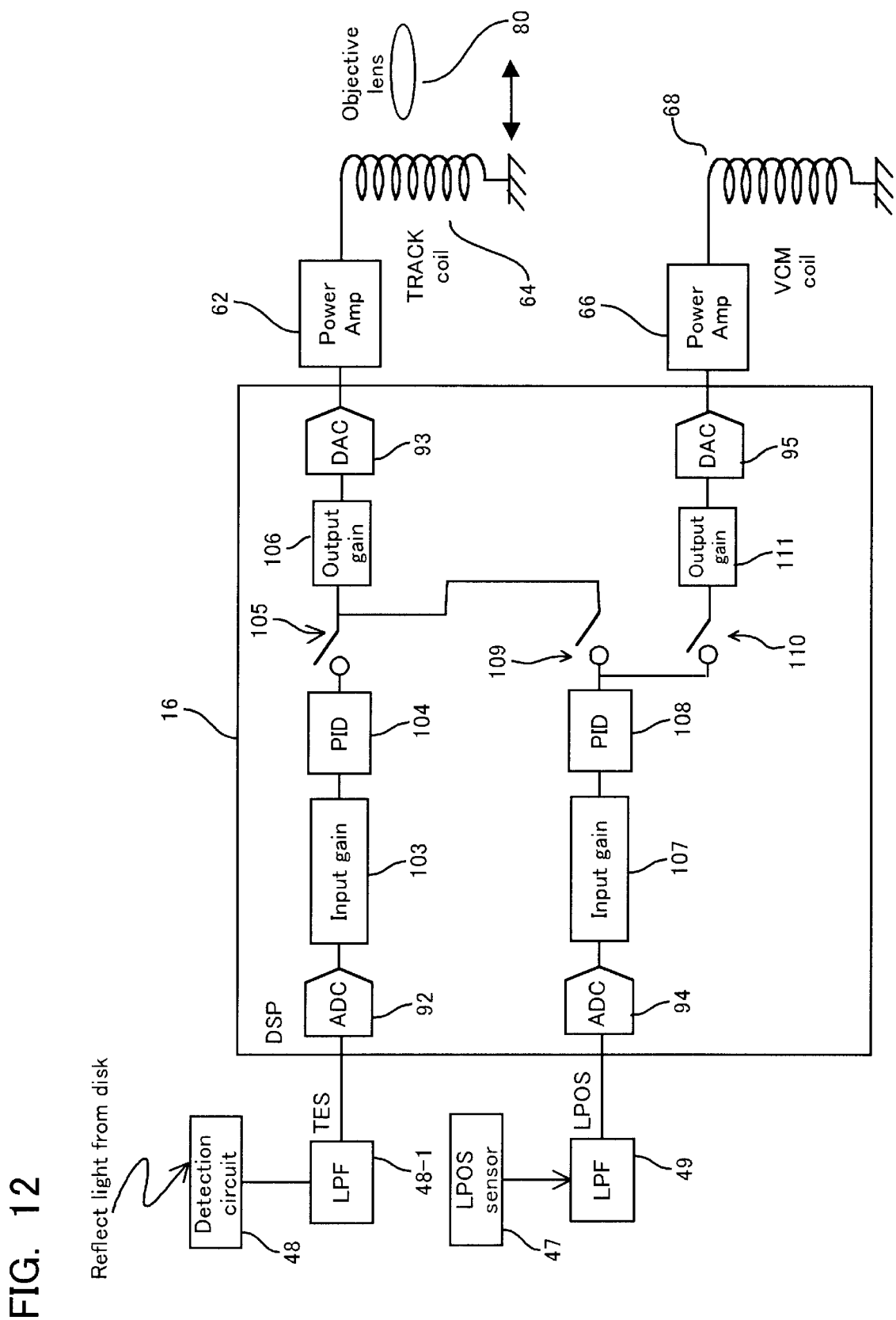
FIG. 12 is a block diagram of another servo loop for explaining another embodiment of the invention.

This kind of PID calculation process exists in other servo loops as well. Therefore, it is also possible to apply it to the PID calculation processing in other servo loops. FIG. 12 is a block diagram of another servo loop.

First, the track-servo loop will be explained. A TES detection circuit 48 generates a track-error signal TES from the output of a 4-division detector 45. This track-error signal TES indicates the amount of shift in the track direction from the center of the laser-beam track. The track-error signal TES passes through a low-pass filter (LPF) 48-1, thereby the high-region noise component that is more than ½ of the sampling frequency is removed.

In the DSP 16, an analog/digital converter (ADC) 92 that is located in the DSP 16 converts the track-error signal TES described above to a digital value. The output of the ADC 92 is read by the DSP 16 for each sampling frequency. An input gain unit 103 of the DSP 16 multiplies the digital value by an input gain G3, and absorbs fluctuation in the input sensitivity (circuit constant, signal sensitivity).

The output of the input gain unit 103 is input to a PID filter (calculation unit) 104. The PID filter 104 performs phase compensation as explained using FIG. 4. The output of the PID filter 104 is input to an output gain unit 106 by way of a switch 105. The output gain unit 106 multiplies that output with an output gain G4, and absorbs fluctuation in the output sensitivity (drive sensitivity of the driver, acceleration of the actuator). This output (instruction value) is given to a digital/analog converter (DAC) 93. The DAC 93 converts this digital value to an analog track current and inputs it to a driver (power amp) 62 to drive the track actuator (track coil) 64. The track coil 64 drives the objective lens 80 in the track direction. The track position of the laser beam is controlled in this way.

The PID filter in FIG. 4 and FIG. 10 described above can also be applied to this kind of track-servo loop. This makes it possible to maintain the margin for the high-frequency component caused by medium defects or vibration.

In the DSP 16, an analog/digital converter (ADC) 94 that is located in the DSP 16 converts the LPOS signal LPOS described above to a digital value. The output of the ADC 94 is read by the DSP 16 for each sampling frequency. An input gain unit 107 of the DSP 16 multiplies the digital value by an input gain G5, and absorbs fluctuation in the input sensitivity (circuit constant, signal sensitivity).

The output of the input gain unit 107 is input to a PID filter (calculation unit) 108. The PID filter 108 performs phase compensation as explained using FIG. 4. The output of the PID filter 108 is input to an output gain unit 111 by way of a switch 110. The output gain unit 111 multiplies that output with an output gain G6, and absorbs fluctuation in the output sensitivity (drive sensitivity of the driver, acceleration of the actuator). This output (instruction value) is given to a digital/analog converter (DAC) 95. The DAC 95 converts this digital value to an analog VCM current and inputs it to a driver (power amp) 66 to drive the VCM coil (carriage actuator) 68. The VCM 68 drives the carriage in the track direction. During track-servo control, the objective lens 80 can be placed in the center of the carriage. This serves as a double servo.

The PID filter in FIG. 4 and FIG. 10 described above can also be applied to this kind of carriage-servo loop. This makes it possible to maintain the margin for the high-frequency component caused by vibration.

Next, the lens-lock-servo control will be explained. The LPOS signal of a LPOS sensor 47 passes through a low-pass filter (LPF) 49 and is input to an analog/digital converter (ADC) 94 that is located in the DSP 16. The ADC 94 converts the LPOS signal LPOS to a digital value. The output of the ADC 94 is read by the DSP 16 for each sampling frequency. An input gain unit 107 of the DSP 16 multiplies the digital value with an input gain G5, and absorbs fluctuations in the input sensitivity (circuit constant, signal sensitivity).

The output of the input gain unit 107 is input to a PID filter (calculation unit) 108. The PID filter 108 performs phase compensation as explained using FIG. 4. The output of the PID filter 108 is input to an output gain unit 106 by way of a switch 109. The output gain unit 106 multiplies that output with an output gain G4, and absorbs fluctuation in the output sensitivity (drive sensitivity of the driver, acceleration of the actuator). This output (instruction value) is given to a digital/analog converter (DAC) 93. The DAC 93 converts this digital value to an analog VCM current and inputs it to a driver (power amp) 62 to drive the track actuator coil 64. By doing this, it is possible to fix the objective lens in the center of the carriage during seeking when the track-servo switch 105 is OFF.

The PID filter in FIG. 4 and FIG. 10 described above can also be applied to this kind of lens-lock-servo loop. This makes it possible to maintain the margin for the high-frequency component caused by vibration.

In addition to the embodiments described above, the invention can be changed as follows:

(1) In the embodiments described above, an example of a magneto-optical disk device as the memory storage device was explained, however this invention could be applied to other memory storage devices as well such as a magnetic disk device, optical disk device, magnetic card device, or optical card device.

(2) An example of a recording/reproduction device was explained, however it is also possible to apply the invention to a reproduction-only device.

The preferred embodiments of the present invention have been explained, however the invention is not limited to these embodiments and can be embodied in various forms within the scope of the present invention.

As described above, the present invention has the following effects:

(1) It limits the calculated result for the differential component of PID calculation, or in other words, the high-region component, to a specified value so phase lag in the high region of a servo system does not equivalently appear. By doing this, it is possible to maintain the margin for the noise or high-frequency component even in systems with large phase lag in the high region.

(2) Moreover, since the calculated result of the integral component, or in other words, the low-region component, is not limited, it is possible to prevent a decrease in follow-ability. Therefore, it is possible to prevent phase lag in the high region without a decrease in follow-ability.

(3) Servo error decreases as does the frequency of interrupts during operation, so it is possible prevent a drop in access speed for accessing the storage medium.

What is claimed is:

1. A servo-control method of a storage device with a head that reads information from a storage medium comprising:
   an operation of detecting the amount of position shift between a read position of said head and a target position;
   an operation of performing a PID calculation of said detected shift amount; and
   an operation of driving an actuator for positioning the read position of the head at the target position based on the PID calculation result; wherein
   said PID calculation operation includes an operation of limiting the calculated result of a differential component of said PID calculation to a specified value without limiting the calculated result of a proportional component of said PID calculation.

2. The servo-control method of claim 1 wherein
   said detection operation comprises:
      an operation of detecting the shift amount of a light beam from a focus position on said storage medium; and further wherein
   said drive operation comprises:
      an operation of driving a focus actuator for focusing said light beam on a recording surface of said storage medium.

3. The servo-control method of claim 1 wherein
   said detection operation comprises:
      an operation of detecting the shift amount of a light beam of said head from a center of the track of said optical storage medium, and further wherein said drive operation comprises:
an operation of driving a track actuator for following said light beam to the track of said storage medium.

4. The servo-control method of claim 1 wherein
said detection operation comprises:
an operation of detecting a position of a track actuator for following a light beam of said head to the track on said storage medium, and further wherein
said drive operation comprises:
an operation of driving a carriage actuator for driving a carriage having said track actuator.

5. The servo-control method of claim 1 wherein
said detection operation comprises:
an operation of detecting a position of a track actuator for following a light beam of said head to the track on said storage medium, and further wherein
said drive operation comprises:
a step of driving said track actuator.

6. The servo-control method of claim 1 further comprising:
an operation of executing said limiting operation, when a light beam of said head is controlled to follow the track on said storage medium.

7. A servo-controller for servo-controlling an actuator comprising:
means for detecting an error signal of said actuator; and
a control circuit for performing a PID calculation for said detected error signal; wherein
said control circuit comprises a servo-control circuit for limiting the calculated result of a differential component of said PID calculation to a specified value, without limiting the calculated result of a proportional component of said PID calculation.

8. The servo-controller of claim 7 wherein
said detection means comprises:
means for detecting the shift amount of a light beam from a focus position on said storage medium; and further wherein
said control circuit drives a focus actuator for focusing said light beam on a recording surface of said storage medium.

9. The servo-controller of claim 7 wherein
said detection means comprises:
means for detecting the shift amount of a light beam of said head from a center of the track of said optical storage medium, and further wherein
said control circuit drives a track actuator for following said light beam to the track of said storage medium.

10. The servo-controller of claim 8 wherein
said detection means comprises:
means for detecting a position of a track actuator for following a light beam of said head to the track on said storage medium, and further wherein said control circuit drives a carriage actuator for driving a carriage having said track actuator.

11. The servo-controller of claim 7 wherein
said detection means comprises:
means for detecting a position of a track actuator for following a light beam of said head to the track on said storage medium, and further wherein said control circuit drives said track actuator.

12. A storage device with a head that reads information from a storage medium comprising:
an actuator for positioning a reading position of said head at a target position;
a detection circuit for detecting the amount of shift between said reading position and said target position;
a control circuit for performing a PID calculation for said detected amount of shift; and
a drive circuit for driving said actuator based on the calculation results; wherein
said control circuit limits the calculation results of a differential component of said PID calculation to a specified value, without limiting the calculated result of a proportional component of said PID calculation.

13. The storage device of claim 12 wherein
said detection circuit comprises:
means for detecting the shift amount of a light beam from a focus position on said storage medium; and further wherein
said drive circuit drives a focus actuator for focusing said light beam on a recording surface of said storage medium.

14. The storage device of claim 12 wherein
said detection circuit comprises:
means for detecting the shift amount of a light beam of said head from a center of the track of said optical storage medium, and further wherein
said drive circuit drives a track actuator for following said light beam to the track of said storage medium.

15. The storage device of claim 12, wherein
said detection circuit comprises:
means for detecting a position of a track actuator for following a light beam of said head to the track on said storage medium, and further wherein
said drive circuit drives a carriage actuator for driving a carriage having said track actuator.

16. The storage device of claim 12 wherein
said detection circuit comprises:
means for detecting a position of a track actuator for following a light beam of said head to the track on said storage medium, and further wherein
said drive circuit drives said track actuator.

* * * * *

UNITED STATES PATENT AND TRADEMARK OFFICE
CERTIFICATE OF CORRECTION

PATENT NO.    : 6,628,581 B1
DATED         : September 30, 2003
INVENTOR(S)   : Tsukahara et al.

It is certified that error appears in the above-identified patent and that said Letters Patent is hereby corrected as shown below:

<u>Column 13,</u>
Line 53, delete "claim 8" and insert -- claim 7 -- therefor.

Signed and Sealed this

Fourth Day of May, 2004

JON W. DUDAS
*Acting Director of the United States Patent and Trademark Office*